United States Patent
Blachier

[11] Patent Number: 6,018,658
[45] Date of Patent: Jan. 25, 2000

[54] PERSONAL COMMUNICATIONS VIA LOW-ORBITING MOVING AND GEOSTATIONARY SATELLITES

[75] Inventor: Bruno Blachier, Neuilly S/ Seine, France

[73] Assignee: Alcatel Espace, Nanterre Cedex, France

[21] Appl. No.: 08/875,590

[22] PCT Filed: Jan. 16, 1996

[86] PCT No.: PCT/FR96/00066

§ 371 Date: Oct. 20, 1997

§ 102(e) Date: Oct. 20, 1997

[87] PCT Pub. No.: WO96/24199

PCT Pub. Date: Aug. 8, 1996

[30] Foreign Application Priority Data

Aug. 2, 1995 [FR] France ................................. 9501206

[51] Int. Cl.⁷ .................................................. H04B 7/185
[52] U.S. Cl. .......................................... 455/427; 455/12.1
[58] Field of Search .................................. 455/12.1, 13.1, 455/13.2, 427; 244/158 R; 370/281

[56] References Cited

U.S. PATENT DOCUMENTS

| | | | |
|---|---|---|---|
| 4,809,935 | 3/1989 | Draim . | |
| 5,327,572 | 7/1994 | Freeburg | 455/13.1 |
| 5,708,963 | 1/1998 | Mobley | 455/12.1 |
| 5,722,042 | 2/1998 | Kimura | 455/13.1 |
| 5,822,680 | 10/1998 | Stuart | 455/12.1 |
| 5,887,257 | 3/1999 | Olds | 455/427 |

FOREIGN PATENT DOCUMENTS

WO 88/04866  6/1988  WIPO .

OTHER PUBLICATIONS

F. Doesiere et al, "A Model for the Handover Traffic in Low Earth–Orbiting (leo) Satellite Networks for Personal Communications", Proceedings of the Golbal Telecommunications Conference (GLOBECOM), Houston, Nov. 29–Dec. 2, 1993, vol. 1 of 4, Nov. 29, 1993, Institute of Electrical and Electronics Engineers pp. 574–578.

G. Pennoni, "JOCOS: 6+1 Satellites For Global Mobile Communications", Proceedings of the Global Telecommunications Conference (GLOBECOM), San Franciso, Nov. 28–Dec. 2, 1994, vol. 3 of 3, Nov. 28, 1994, Institute of Electrical and Electronics Engineers, pp. 1369–1374.

*Primary Examiner*—Curtis A. Kuntz
*Assistant Examiner*—Nick Corsaro
*Attorney, Agent, or Firm*—Sughrue, Minn, Zinn Macpeak & Seas, PLLC

[57] ABSTRACT

Apparatus for providing high reception capacity to hand-held or mobile stations using moving satellites in low orbit. The system makes use of one or more geostationary satellites which provide broad band transmission to the users of hand-held or mobile stations. Only the data addressed to hand-held or mobile stations uses the path via the geostationary satellite(s), information coming from the hand-held or mobile stations passing via moving satellites in low orbit. The system enables mobile or hand-held stations to make use of multimedia applications.

5 Claims, 1 Drawing Sheet

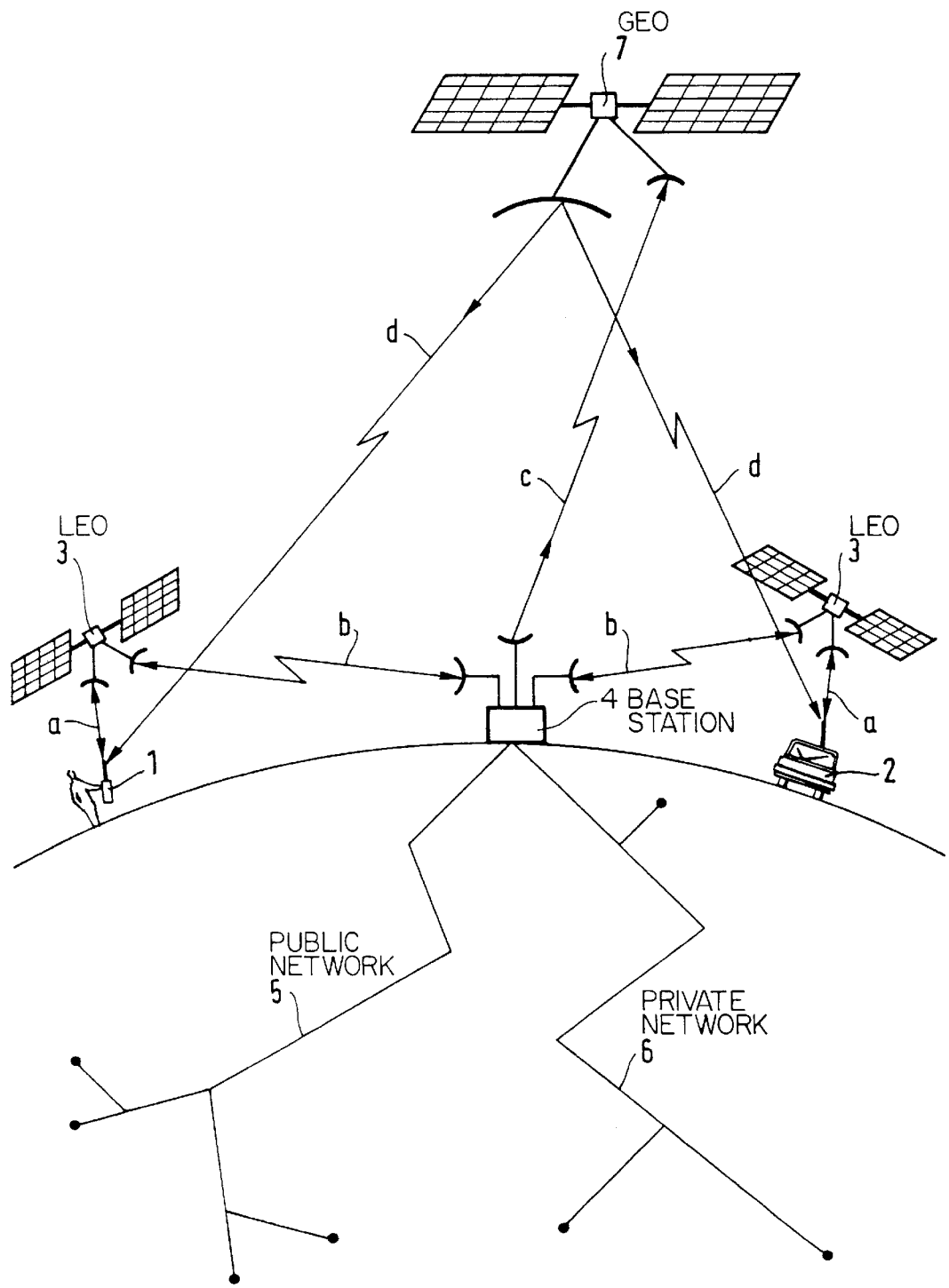

PERSONAL COMMUNICATIONS VIA LOW-ORBITING MOVING AND GEOSTATIONARY SATELLITES

The field relates to using satellites to enable people having hand-held or mobile stations to communicate with public or private communications networks.

Prior art techniques make use either of terrestrial systems, or else they make use of geostationary satellites, or of moving satellites.

The invention claims the use of geostationary satellites for establishing transmission from public or private communications networks to hand-held or mobile stations and moving satellites for establishing transmission from hand-held or mobile stations to communications networks.

FIG. 1 shows how information travels between the satellites.

FIG. 1 shows how the claimed communications system operates.

Hand-held stations (1) or mobile stations (2) mounted on vehicles or aircraft send information to moving satellites (3) along paths (a) and receive information from the satellites (3) along paths (a).

These satellites receive the signals and, with or without on-board processing, retransmit them to ground stations (4) which are access points to public or private networks (5, 6 respectively), with this taking place along path (b) of FIG. 1.

The same ground stations transmit signals coming from public or private networks to a geostationary satellite (7) or satellites, following path (c) in FIG. 1.

The satellites retransmit the information to the hand-held or mobile stations along the path marked (d) in FIG. 1, optionally after performing on-board signal processing.

The invention makes it possible to interchange information at low data rate (or medium data rate) over paths (a) (b), but at high data rate over paths (c) (d) providing mobile and hand-held stations with multimedia options.

What is claimed is:

1. A radiocommunications system by means of moving satellites in low orbit, and a least one geostationary satellite, characterized in that to increase the transmission capacity between the hand-held or mobile stations (1, 2) and at least one ground station (4), transmission of data takes place over first and second paths, the first path (a, b) comprising a data interchange path (a) between hand-held or mobile stations (1, 2) and moving satellites (3) in low orbit, and a data interchange path (b) between the moving satellites (3) in low orbit, and a data interchange path (b) between the moving satellites (3) in low orbit and the ground station (4); and the second path (c, d) comprising an up path (c) from the ground station (4) to the geostationary satellite (7) and a down path (d) from the geostationary satellite (7) to the hand-held or mobile stations (1, 2).

2. A radiocommunications system according to claim 1, characterized in that data is passed at low or medium rates in the data interchange path (a) between the hand-held or mobile stations (1, 2) and the moving satellites (3) in low orbit, and in the data exchange path (b) between the moving satellites (3) in low orbit and the ground station (4) and in that data is passed at high rates in the up path (c) from the ground station (4) to the geostationary satellite (7) and the down path (d) from the geostationary satellite (7) to the hand-held or mobile stations (1, 2).

3. A radiocommunications system according to claim 1, characterized in that said ground station (4) constitutes a gateway to public or private networks (5, 6) with which the hand-held or mobile stations (1, 2) are connected.

4. A radiocommunications system according to claim 1, characterized in that the data interchange path (a) between the hand-held or mobile stations (1, 2) and the moving satellites (3) in low orbit is essentially an up path (a) from the hand-held or mobile stations (1, 2) to the moving satellites in low orbit (3), and the data interchange path (b) between the moving satellites in low orbit (3) and the ground station (4) is essentially a down path (b) from the moving satellites (3) in low orbit to the ground station (4).

5. A radiocommunications system according to claim 1, characterized in that said data comprises multimedia information.

* * * * *